United States Patent [19]
Takeda et al.

[11] Patent Number: 5,760,572
[45] Date of Patent: Jun. 2, 1998

[54] INTERMITTENT MOTION APPARATUS

[75] Inventors: Harumi Takeda, Osakasayama; Takashi Fujii, Katano, both of Japan

[73] Assignee: Tagawasyouji Co., Ltd., Hyogo, Japan

[21] Appl. No.: 853,798

[22] Filed: May 9, 1997

Related U.S. Application Data

[63] Continuation of Ser. No. 451,364, May 26, 1995, abandoned.

[30] Foreign Application Priority Data

Jun. 2, 1994 [JP] Japan .................. 6-145651

[51] Int. Cl.$^6$ .................................. G05F 1/40
[52] U.S. Cl. .................. 323/288; 323/299; 323/906
[58] Field of Search ........................... 323/299, 288, 323/317, 906

[56] References Cited

U.S. PATENT DOCUMENTS

| | | | |
|---|---|---|---|
| 3,526,821 | 9/1970 | Thomas | 320/1 |
| 3,724,200 | 4/1973 | Donner | 368/149 |
| 4,057,736 | 11/1977 | Jeppson | 307/78 |
| 4,709,200 | 11/1987 | Ochiai | 320/1 |
| 4,901,295 | 2/1990 | Taguezout et al. | 368/142 |
| 4,959,603 | 9/1990 | Yamamoto et al. | 320/1 |
| 5,270,636 | 12/1993 | Lafferty | 320/61 |
| 5,442,348 | 8/1995 | Mushell | 340/932.2 |
| 5,498,951 | 3/1996 | Okamura | 322/2 R |

FOREIGN PATENT DOCUMENTS 595 460 A1   5/1994   European Pat. Off.

OTHER PUBLICATIONS

Abstract of Japanese Patent Publ. No. JP59026089, dated Oct. 2, 1984.

*Primary Examiner*—Stuart N. Hecker
*Assistant Examiner*—Bao Q. Vu
*Attorney, Agent, or Firm*—Nikaido, Marmelstein, Murray & Oram LLP

[57] ABSTRACT

A solar cell system for supplying electric energy from solar cells to loads. This solar cell system includes solar cells for converting light energy into electric energy, an electric double layer capacitor for storing the electric energy from the solar cells, and a discharge controller for causing the electric double layer capacitor to discharge electric energy to the loads intermittently in predetermined cycles while charging the electric double layer capacitor. A period of time for discharging is shorter than a period of time for charging, and a current discharged to the loads is larger than a charging current applied to the electric double layer capacitor.

10 Claims, 3 Drawing Sheets

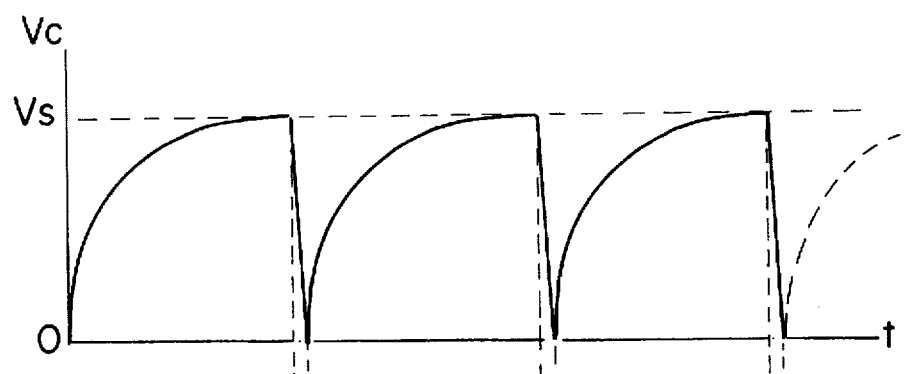
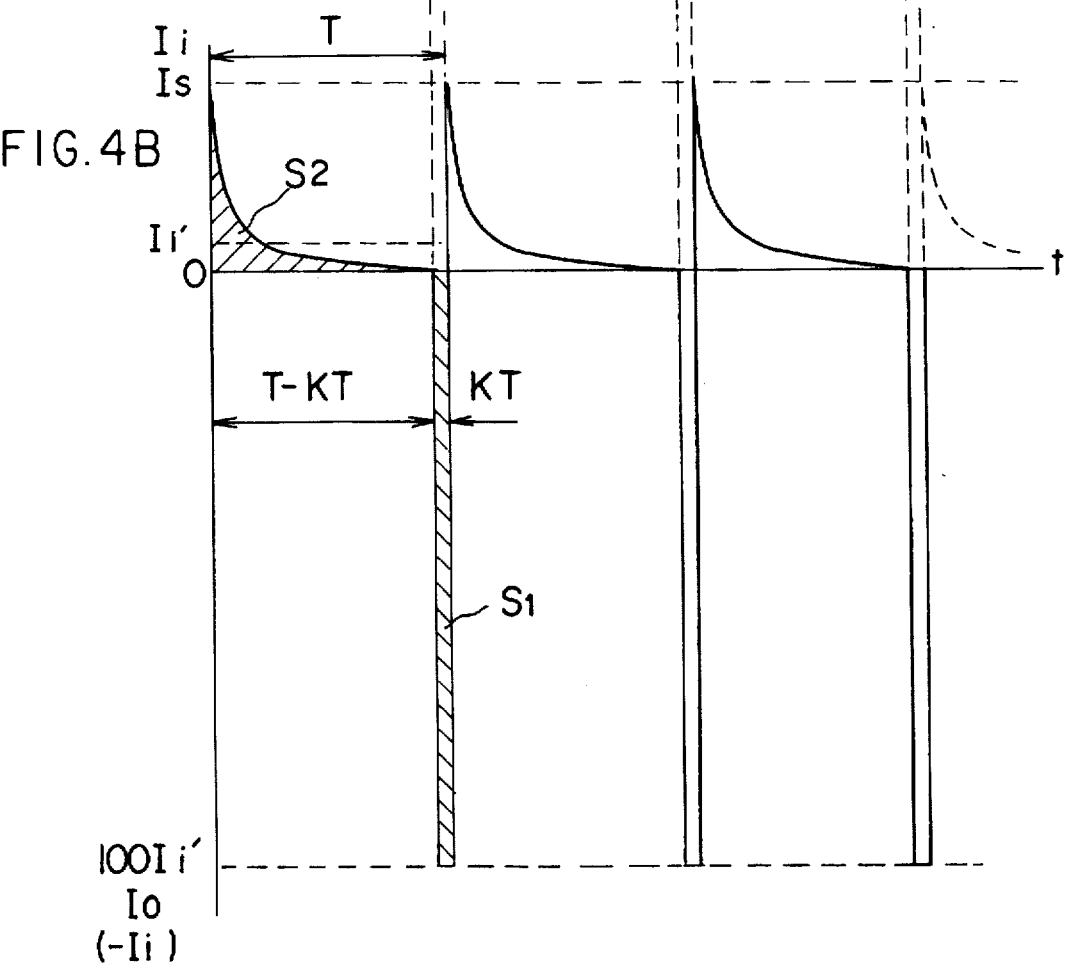

INTERMITTENT MOTION APPARATUS

This application is a continuation of application Ser. No. 08/451,364 filed May 26, 1995 now abandoned.

BACKGROUND OF THE INVENTION

(1) Field of the Invention

This invention relates to a solar cell system for supplying a load with electric energy from solar cells, and to an intermittent motion apparatus such as an advertising display for attracting attention to articles sold at special prices.

(2) Description of the Related Art

Conventional apparatus using solar cells include relatively small apparatus such as electronic calculators, clocks and the like powered by solar cells, and relatively large apparatus such as pumps for automatically drawing water for irrigating fields, large advertising towers and the like.

Such conventional apparatus have the following drawbacks.

There are strong demands for the electronic calculators, clocks and the like powered by solar cells to be small and lightweight. Thus, small solar cells are mounted in these apparatus. Consequently, loads connected to these small solar cells are limited to devices that consume little electric power, such as liquid crystal displays.

On the other hand, relatively large pumps and advertising towers consume large amounts of power. These apparatus therefore require large solar cells to cope with the power consumption.

SUMMARY OF THE INVENTION

This invention has been made having regard to the state of the art noted above, and its object is to provide a solar cell system capable of acquiring a large amount of electric power from small solar cells, and an intermittent motion apparatus using this solar cell system.

The above object is fulfilled, according to a first aspect of this invention, by a solar cell system for supplying electric energy from solar cells to loads, including solar cells, for converting light energy into electric energy, an electric double layer capacitor, for storing the electric energy from the solar cells, and a discharge controller for causing the electric double layer capacitor to discharge electric energy to the loads intermittently in predetermined cycles while charging the electric double layer capacitor, such that a period of time for discharging is shorter than a period of time for charging, and that a current discharged to the loads is larger than a charging current applied to the electric double layer capacitor.

When the electric double layer capacitor discharges the electric energy charged by the solar cells to the loads, the charge controller causes the energy to be supplied intermittently in predetermined cycles such that a period of time for discharging is shorter than a period of time for charging, and that a current discharged is larger than a charging current. The electric energy charged (charging time X charging current) and the electricity energy discharged (discharging time X current discharged) are equal. Consequently, an increased current may be discharged by reducing the discharging time. Increased power may be supplied to the loads in each cycle of intermittent motion.

With the discharge controller controlling the discharging time to be shorter than the charging time, a large amount of power may be acquired from small solar cells. Thus, the small solar cells can drive large loads.

Preferably, the solar cells are formed of amorphous silicon.

The solar cells formed of amorphous silicon efficiently absorb light energy of short wavelengths, compared with solar cells formed of polycrystalline silicon. Thus, the electric double layer capacitor may be charged efficiently by a room light such as a fluorescent light.

Preferably, the solar cell system of this invention includes a reverse current preventive diode connected in series between the solar cells and the electric double layer capacitor.

In cloudy weather, for example, the electromotive force of the solar cells may be smaller than the voltage at opposite ends of the electric double layer capacitor. At this time, the diode can prevent reverse current flowing from the electric double layer capacitor to the solar cells. Thus, electric energy charged may be supplied to the loads without waste.

Preferably, the reverse current preventive diode comprises a Schottky diode.

An ordinary diode has a forward voltage [VF] as high as 0.6V, whereas a Schottky diode has a forward voltage in the order of 0.3V to suppress a decrease in the voltage generated by the solar cells. As result, the electric energy generated by the solar cells may be applied to the electric double layer capacitor without waste.

Preferably, a voltage control circuit is connected between the solar cells and the electric double layer capacitor for controlling an output voltage of the solar cells not to exceed a maximum rated voltage the electric double layer capacitor.

When, for example, sunlight is stronger than expected, the voltage generated at opposite ends of the solar cell array may exceed the maximum rated voltage of the double layer capacitor. However, the voltage control circuit controls the voltage supplied not to exceed the maximum rated voltage, thereby to protect the double layer capacitor. This feature allows the system to be used even in an intense sunlight condition.

Preferably, electric energy is discharged to establish T1/T being approximately 1% where T is each of the predetermined cycles, and T1 is a load driving time (discharging time) in each of the predetermined cycles.

In a further aspect of the invention, there is provided an intermittent motion apparatus for intermittently driving loads, including solar cells, for converting light energy into electric energy, an electric double layer capacitor, for storing the electric energy from the solar cells, an output device driven by electric energy, supplied from the electric double layer capacitor, and a discharge controller for causing the electric double layer capacitor to discharge electric energy to the output device intermittently in predetermined cycles while charging the electric double layer capacitor, such that a period of time for discharging is shorter than a period of time for charging, and that a current discharged to the output device is larger than a charging current applied to the electric double layer capacitor.

When the electric double layer capacitor discharges electric energy to the output device, the charge controller causes the energy to be supplied intermittently in predetermined cycles such that a period of time for discharging is shorter than a period of time for charging, and that a current discharged is larger than a charging current. The electric energy charged (charging time X charging current) and the electricity energy discharged (discharging time X current discharged) are equal. Consequently, an increased current may be discharged by reducing the discharging time. Increased power may be supplied to the output device in each cycle of intermittent motion.

With the discharge controller controlling the discharging time to be shorter than the charging time, a large amount of power may be acquired from small solar cells. Thus, the intermittent motion apparatus provided by this invention can drive a large output device having a relatively large energy consumption.

Preferably, the output device comprises a motor.

The output device may comprise light emitting diodes.

The output device comprises a sounding device.

Further, the output device may be a solenoid.

Preferably, the motor includes a pivotable member connected to a rotary shaft thereof, for intermittently swinging a swing member swingably mounted in a box and having a weight attached to a lower position thereof to stand upright in a normal state.

The motor acting as the output device is driven intermittently by the intermittent discharge from the discharge controller. With the pivotable member connected to the rotary shaft of the motor, intermittent rotation of the motor swings the swing member swingably mounted in the box. The intermittent swinging movement of the swing member can attract shoppers' attention.

Alternatively, the motor may include a rotary axis extending downward from a box suspended from a room light through suspension elements, the rotary axis having an advertising sigh attached to a lower position thereof.

The motor acting as the output device is driven intermittently by the intermittent discharge from the discharge controller. With the intermittent rotation of the rotary axis of the motor, the sign attached to the lower position thereof rotates in horizontal directions. The box of this apparatus is suspended from a room light by means of suspension elements. Thus, the solar cells may be arranged close to the light source to realize a large amount of output current. This allows the solar cells to have a reduced area to diminish the apparatus. Further, the sign suspended to rotate intermittently can attract shoppers' attention.

Preferably, the solar cells in this apparatus are formed of amorphous silicon.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 4A and 4B are time charts of operation of the solar cell system; and

DESCRIPTION OF THE PREFERRED EMBODIMENTS

Preferred embodiments of this invention will be described in detail hereinafter with reference to the drawings.

First Embodiment

Figure 1:
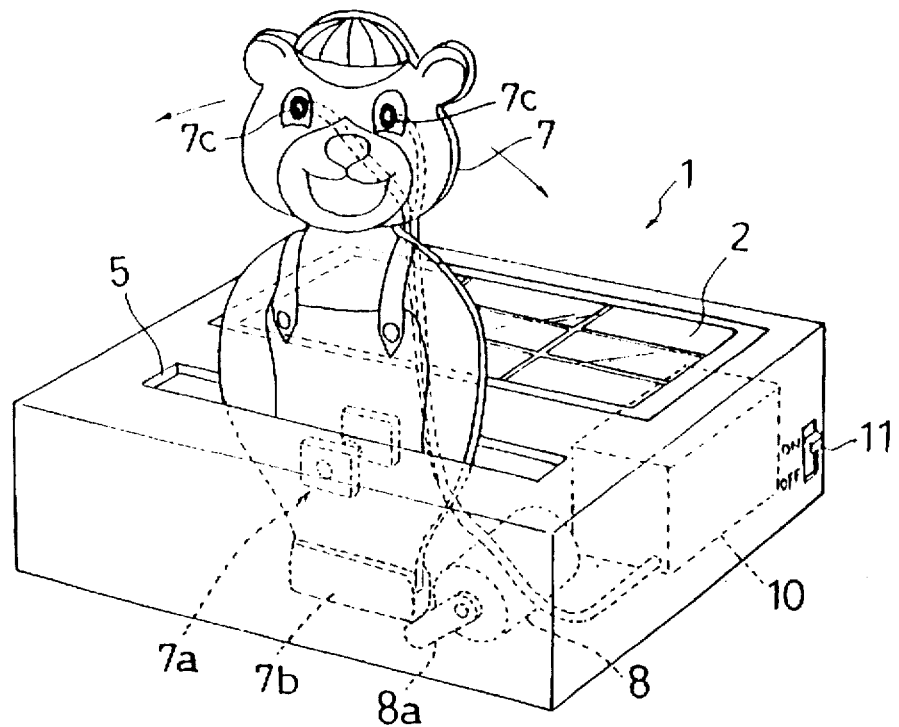
FIG. 1 is an overall perspective view of an advertising display in a first embodiment of this invention.

FIG. 1 is an overall perspective view of an advertising display in a first embodiment of this invention.

In FIG. 1, numeral 1 denotes the advertising display which is approximately the size of a cigarette packet. This advertising display 1 has a plurality of solar cells 2 (which generate electromotive force by an irradiation of light) arranged in a lattice pattern on an upper rear surface thereof to provide required electric energy. The advertising display 1 has an opening 5 formed in an upper front surface thereof. A swing member 7 simulating a bear, for example, is mounted in the opening 5 and pivotably supported by a support 7a. A weight 7b is attached to a lower position of swing member 7 to balance the swing member 7 in upright posture. The swing member 7 has light diodes 7c fitted in the eyes of the bear. The advertising display 1 has a power switch 11 on a side surface thereof. The advertising display 1 having the above construction is placed near bargain articles calling for shoppers' attention.

The solar cells 2 should preferably be formed of amorphous silicon.

The light emitting diodes 7c of swing member 7 are lit by a control circuit 10 described later. Further, the swing member 7 is pivotable about the support 7a, with the weight 7b pushed by a pivotal element 8a driven by rotation of a motor 8.

Figure 2:
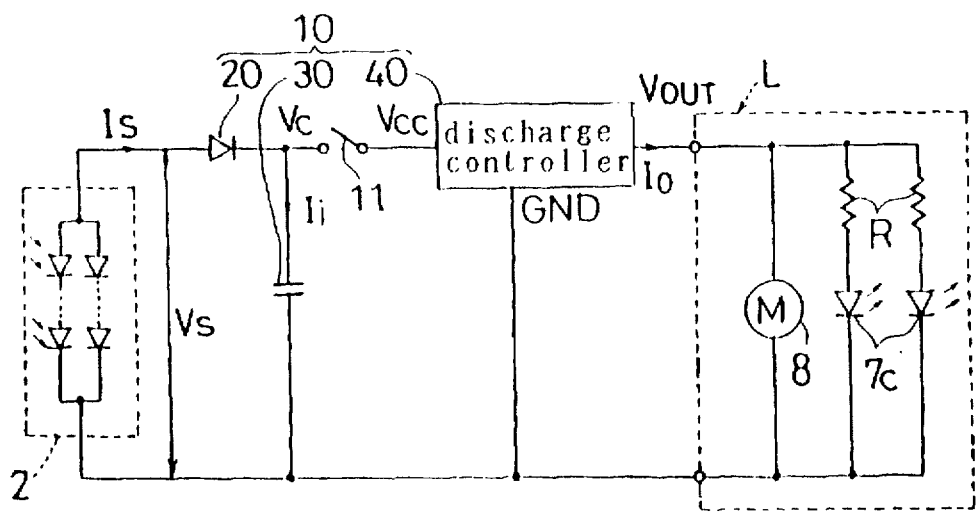
FIG. 2 is a circuit diagram of a solar cell system.

Reference is made to FIG. 2 next. FIG. 2 is a circuit diagram of a solar cell system used in the advertising display 1.

Numeral 2 denotes the above solar cells. When the array of solar cells 2 is irradiated with light, voltage VS is generated at opposite ends thereof, and current IS is then provided. The array of solar cells 2 has a positive terminal connected to one end of an electric double layer capacitor 30 through a diode 20 for reverse current prevention, and also to a supply line VCC of a discharge controller 40 through a supply switch 11. The array of solar cells 2 has a negative terminal connected to the other end of the double layer capacitor 30, and also to a grounding line GND of the discharge controller 40. The reverse current preventive diode 20, double layer capacitor 30 and discharge controller 40 above the control circuit 10 noted hereinbefore.

When light irradiates the solar cells 2, this circuit starts charging the double layer capacitor 30 substantially with current IS, which continues until voltage VC at opposite ends thereof equalizes voltage VS. Thus, the electric double layer capacitor 30 has a maximum rated voltage greater than voltage VS of solar cells 2.

Preferably, the reverse current preventive diode 20 comprises a Schottky diode, for example, which has a minimum forward voltage, so that the voltage VS generated by the solar cells 2 is maintained as high as possible.

In order to prevent a voltage greater than the maximum rated voltage from being applied to the double layer capacitor 30, the output voltage of solar cells 2 may be applied to the double layer capacitor 30 through a voltage control circuit for controlling the output voltage not to exceed the maximum rated voltage.

There is no limitation to charging current (maximum charging current) for the double layer capacitor 30. Consequently, there is no need for a complex charging current control circuit unlike an Ni-Cd battery. This feature allows the control circuit to be simplified. The double layer capacitor 30 has an open type failure mode for increasing a series internal resistance, which involves no danger of bursting or burning.

The discharge controller 40 controls an electric current supplied to loads L connected between output line $V_{OUT}$ and grounding line GND. Loads L include the motor 8 and two light emitting diodes 7c noted hereinbefore. Each of the two light emitting diodes 7c is connected to the output line $V_{OUT}$ grounding line GND of discharge controller 40 through a current limiting resistor R.

The solar cells 2 control circuit 10 and double layer capacitor 30 correspond to the solar cell system of this invention. The light emitting diodes 7c and motor 8 correspond to the output device.

Figure 3A:
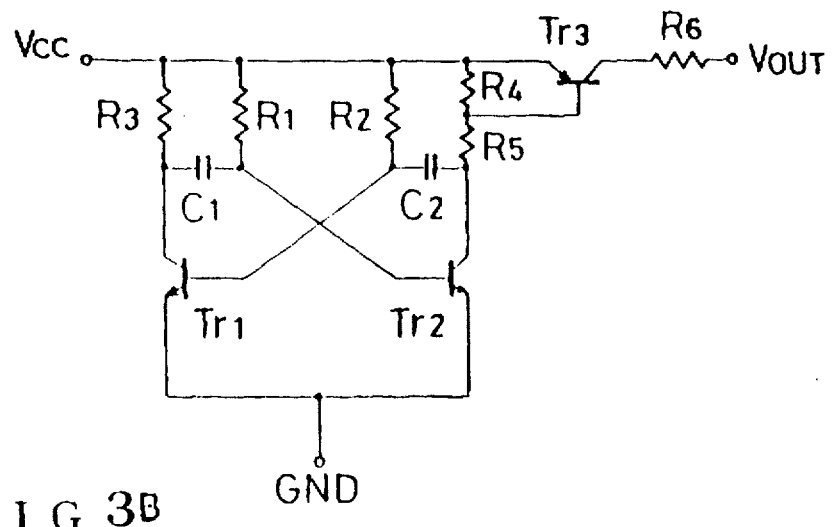
FIGS. 3A and 3B are circuit diagrams of a discharge controller.

Next, reference is made to FIG. 3A showing a circuit diagram of discharge controller 40. This discharge controller 40 includes an astable multivibrator (which is the self-driven type to provide a square-wave output) having resistors R1 and R5, a capacitor C1, a transistor Tr2, resistors R2 and R3, capacitor C2 and a transistor Tr1; a current booster circuit having a resistor R4 and a transistor Tr3 for boosting the output of the astable multivibrator; and a resistor R6 for limiting the current supplied to loads L connected to output terminal $V_{OUT}$. The discharge controller 40 may include one of various other types of square wave output circuit, instead of being limited to the astable multivibrator, as long as it is capable of driving the loads in cycles. It is possible to employ an oscillating circuit with a C-MOS inverter, for example.

Figure 3B:
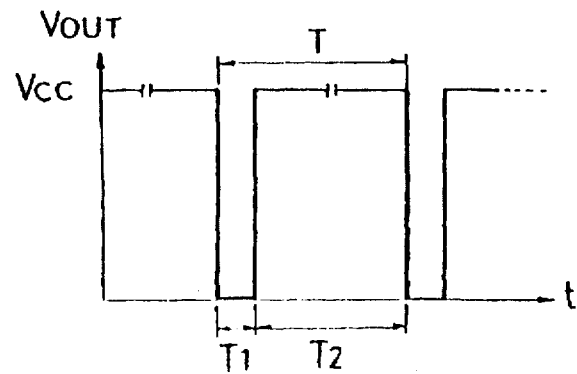

FIG. 3B shows an example of square waves output to the output line $V_{OUT}$ of discharge controller 40 constructed as above. In FIG. 3B, reference T represents each cycle of the square-wave output. Reference T1 represents a period of time in which the transistor Tr2 of the current booster circuit is placed in conductive state for supplying current to loads L (load driving period). Reference T2 represents a period of time in which the transistor Tr2 of the current booster circuit is placed in non-conductive state for supplying no current to loads L (load non-driving period). As is well known, approximate values of load driving period T1, load non-driving period T2 and load driving cycle T are derived from the following equations:

load driving period T1=0.69 C2 R2 load non-driving period T2=0.69 C1 R1 load driving cycle $T=T1+T2$

In this embodiment, for example, constants are set for the discharge controller 40 such that load driving period T1 is 1% of (duty ratio K) of cycle T. Assuming, for example, that load driving cycle T is 1 sec. (i.e. charge charging time), then load driving period T1 is 0.01 sec. (=K·T), and load non-driving period T2 is 0.99 sec. Such instantaneous charging and discharging as in charging time T (=1 sec.) are impossible with a second battery such as an Ni-Cd battery. It is only possibly by employing the electric double layer capacitor capable of charging and discharging in a short time. This double layer capacitor 30 performs charging and discharging through adsorption/desorption of electric charge to/from activated carbon. This enables a repetition in the order of 100,000 times. Thus, the advertising display 1 may be used repeatedly over a long period of time. Besides, there is no need for maintenance, and no battery is used to impart no adverse influence to the environment.

The duty ratio K=1% is not limitative, but this value is variable. The value should be determined according to loads and environment.

The charge characteristic (electric energy charged) is expressed by the following equation, where the double layer capacitor 30 has capacitance C (F), the charging time is T (sec.), and charging current Ii has an average value Ii' for charging time T. The collector resistances R3 and R5 of transistors Tr1 and Tr2 are set to large values to reduce current consumption by the discharge controller 40 is sufficiently small and negligible compared with discharge current Io.

$$C \cdot VS = Ii' \cdot T \quad (1)$$

The discharge characteristic (electric energy discharged) is expressed by the following equation:

$$C \cdot VS = Io \cdot K \cdot T \quad (2)$$

Assuming that capacitance C of double layer capacitor 30 and voltage VS of solar cells 2 are invariable with a repetition of charging and discharging, the electric energy charged and electric energy discharged are equal. Thus, the following equation is obtained from equations (1) and (2):

$$Ii' \cdot T = Io \cdot K \cdot T$$
$$\therefore Io = Ii'/K \quad (3)$$

Substituting duty ratio K=1% (0.01) into equation (3), Io=100·Ii'. Thus, it is seen that the current (discharge current) Io which can be supplied to loads L is 100 times the average value (Ii') of charging current Ii. The electric energy charged (charging time X charging current) and the electricity energy discharged (discharging time X current discharged) are equal. Consequently, an increased current may be discharged by reducing the discharging time. An increased current (current discharged), though, for a short time, may be supplied to the loads in each cycle of intermittent motion.

Next, reference is made to the time charts of FIG. 4. The time chart of FIG. 4A shows voltage Vc at the opposite ends of double layer capacitor 30. The time chart of FIG. 4B shows charging current Ii for the double layer capacitor 30, and load current Io (current discharged) supplied to loads L. The origin of time axis "t" represent a point of time at which the power switch 11 of advertising display 1 is turned on to cause the solar cells 2 to be irradiated with light.

Voltage Vc at the opposite ends of double layer capacitor 30 increases with a time constant based on the series internal resistance and its own capacitance, substantially to reach output voltage VS of solar cells 2 (strictly speaking, lower by the forward voltage of the reverse current preventive diode). Charging current Ii at this time decreases from output current IS of solar cells 2 forming a peak. The electric energy charged is expressed by equation (1), and by area S2 in FIG. 4B. Further, the average value Ii' of charging current Ii is shown in FIG. 4B.

Upon lapse of load non-driving period T2 (=T−K·T), the transistor Tr3 of discharge controller 40 becomes "on" state to supply load current Io from output terminal $V_{OUT}$ to loads L. This load current Io is 100 times average charging current Ii', based on equation (3). Upon lapse of load driving period T1 (=K·T), charging of double layer capacitor 30 and discharging to loads L are repeated.

With the repetition of charging and discharging, the motor 8 of advertising display 1 is driven intermittently, causing the pivotal element 8a to strike the weight 7b of swing member 7. As a result, the swing member 7 swings intermittently. In addition, the light emitting diodes 7c acting as the eyes of the bear are lit intermittently to attract attention.

Second Embodiment

Figure 5:
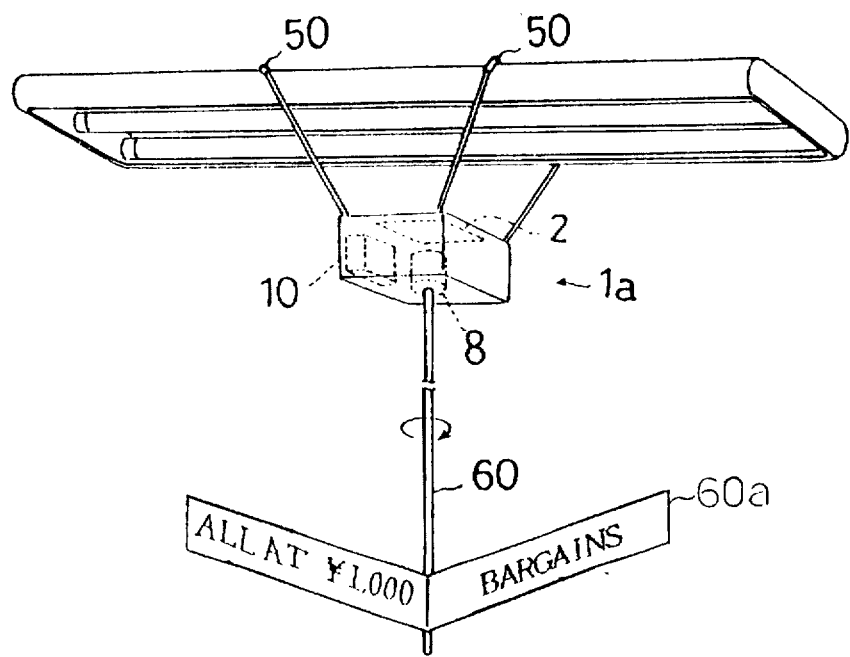
FIG. 5 is an overall perspective view of an advertising display in a second embodiment of this invention.

FIG. 5 is an overall perspective view of a modified advertising display.

This advertising display 1a is, for example, suspended from a fluorescent lamp by means of suspension elements 50. A sign 60a is attached to a lower end of a rotary rod 60 connected to a motor 8 mounted in the display 1a. With this apparatus, the motor 8 is driven intermittently in the charge and discharge cycles described above, to rotate the sign 60a intermittently in horizontal directions through the rotary axis 60. The sign in intermittent rotation attracts attention. The motor 8, rotary axis 60 and sign portion 60a correspond to the output device in this invention.

According to this apparatus, the solar cells 2 may be arranged near the light source to realize a large output current. This allows a reduced area of solar cells to diminish the advertising display.

In the first and second embodiments described above, the loads of motor and light emitting diodes constitute the output device. This invention is not limited thereto, but various other loads may constitute the output device. For example, a sounding device may be employed as a load to sound intermittently.

The first and the second embodiments have been described, exemplifying advertising displays as the intermittent motion apparatus utilizing the solar cell system. This invention is applicable to various other types of intermittent motion apparatuses. For example, the invention may be applied to a solar car for intermittently operating a solenoid to drive its wheels.

The present invention may be embodied in other specific forms without departing from the spirit or essential attributes thereof and, accordingly, reference should be made to the appended claims, rather than to the foregoing specification, as indicating the scope of the invention.

What is claimed is:

1. An intermittent motion apparatus for intermittently driving loads, comprising:

solar cells for converting light energy into electric energy;

an electric double layer capacitor for storing the electric energy from said solar cells;

a reverse current preventive diode connected in series between said solar cells and said electric double layer capacitor for preventing a reverse current of electric energy flowing from said electric double layer capacitor to said solar cells;

a motor driven by electric energy supplied from said electric double layer capacitor;

a pivotable member connected to a rotary shaft of said motor;

a swing member having a weight attached to a lower position thereof to stand upright in a normal state, said swing member being swung by said pivotable member; and discharge control means for controlling said electric double layer capacitor to intermittently discharge electric energy to said motor in predetermined cycles while charging said electric double layer capacitor, such that a period of time for discharging is shorter than a period of time for charging, and that a current discharged to said motor is larger than a charging current applied to said electric double layer capacitor.

2. An apparatus as defined in claim 1, wherein said solar cells are formed of amorphous silicon.

3. An apparatus as defined in claim 1, wherein said reverse current preventive diode comprises a Schottky diode.

4. An apparatus as defined in claim 1, further comprising a voltage control circuit connected between said solar cells and said electric double layer capacitor for controlling an output voltage of said solar cells not to exceed a maximum rated voltage of said electric double layer capacitor.

5. An apparatus as defined in claim 1, wherein electric energy is discharged to establish T1/T being approximately 1% where T is each of said predetermined cycles, and T1 is a load driving time (discharging time) in each of said predetermined cycles.

6. An intermittent motion apparatus for intermittently driving loads, comprising:

solar cells for converting light energy into electric energy;

an electric double layer capacitor for storing the electric energy from said solar cells;

a reverse current preventive diode connected in series between said solar cells and said electric double layer capacitor for preventing a reverse current of electric energy flowing from said electric double layer capacitor to said solar cells;

a motor driven by electric energy supplied from said electric double layer capacitor;

a box having said solar cells arranged on an upper surface thereof, and containing said electric double layer capacitor, said reverse current preventive diode and said motor;

an advertising sign connected to a rotary shaft of said motor and extending downward from said box;

suspension means for suspending said box from a room light; and discharge control means for controlling said electric double layer capacitor to intermittently discharge electric energy to said motor in predetermined cycles while charging said electric double layer capacitor, such that a period of time for discharging is shorter than a period of time for charging, and that a current discharged to said motor is larger than a charging current applied to said electric double layer capacitor.

7. An apparatus as defined in claim 6, wherein said solar cells are formed of amorphous silicon.

8. An apparatus as defined in claim 6, wherein said reverse current preventive diode comprises a Schottky diode.

9. An apparatus as defined in claim 6, further comprising a voltage control circuit connected between said solar cells and said electric double layer capacitor for controlling an output voltage of said solar cells not to exceed a maximum rated voltage of said electric double layer capacitor.

10. An apparatus as defined in claim 6, wherein electric energy is discharged to establish T1/T being approximately 1% where T is each of said predetermined cycles, and T1 is a load driving time (discharging time) in each of said predetermined cycles.

* * * * *